Aug. 17, 1965 J. G. LORD 3,201,039
ROTARY CAM CONTROLLED VOTING MACHINE
Filed April 27, 1964 7 Sheets-Sheet 1

INVENTOR.
JOHN G. LORD
BY
*Louis Necho*
ATTORNEY.

INVENTOR.
JOHN G. LORD
BY Louis Necho
ATTORNEY.

Aug. 17, 1965    J. G. LORD    3,201,039
ROTARY CAM CONTROLLED VOTING MACHINE
Filed April 27, 1964    7 Sheets-Sheet 4

INVENTOR.
JOHN G. LORD
BY
ATTORNEY.

Aug. 17, 1965    J. G. LORD    3,201,039
ROTARY CAM CONTROLLED VOTING MACHINE
Filed April 27, 1964    7 Sheets-Sheet 5

INVENTOR.
JOHN G. LORD
BY Louis Necho
ATTORNEY.

Aug. 17, 1965  J. G. LORD  3,201,039
ROTARY CAM CONTROLLED VOTING MACHINE
Filed April 27, 1964  7 Sheets-Sheet 6

INVENTOR.
JOHN G. LORD
BY
ATTORNEY.

INVENTOR.
JOHN G. LORD
BY
*Louis Nechs*
ATTORNEY.

United States Patent Office 3,201,039
Patented Aug. 17, 1965

3,201,039
ROTARY CAM CONTROLLED VOTING MACHINE
John G. Lord, Swarthmore, Pa., assignor to Shoup Voting Machine Co., a corporation
Filed Apr. 27, 1964, Ser. No. 362,581
5 Claims. (Cl. 235—50)

This invention relates to a voting machine of the type shown in Shoup Patents Nos. 2,054,102, 2,251,254, 2,826,356 and 3,112,872.

One object of the invention is to produce an improved voting machine of the type set forth.

A machine of the type set forth includes a curtain for closing the voting booth; means for opening and closing the curtain, vote counters, voting spindles which are rotatable in vote-casting direction, and back; a restoring frame (in Patents 2,054,102 and 2,251,254, or individual handle return members (in Patent 2,826,256), which are movable upwardly upon rotation of the voting spindles in vote-casting direction to activate the counters, etc., and which upon reverse movement of the voting spindles, move downwardly to restore, or re-set, the voting spindles, etc., and means cam bar 58 in Patent 2,054,102, the movement of which causes the return members to engage said counters with, and to disengage them from the voting spindles, and so forth.

For a full understanding of the structure and operation of a voting machine reference may be had to the above mentioned and other patents. For the purpose of the present disclosure, it is only necessary to point out that the operation of the prior Shoup machine above mentioned, was controlled by the horizontal reciprocation of cam bar 58. See, for example, FIG. 1 of Patent 2,251,154.

Thousands of machines of the type set forth have been used very successfully for many years. But, with the increasing use of voting machines for elections in smaller political subdivisions, in local labor unions, and in various other organizations where the number of offices and the number of contenders for various offices is relatively small, compact machines, which have only three or four columns of voting spindles instead of nine or ten, will suffice. For such compact machines, the standard, horizontally reciprocable cam bar 58 above referred to and its adjuncts, is not wholly satisfactory because the length of the bar and the space required for its horizontal movement make it impossible to reduce the width of the machine as may be otherwise possible.

To overcome these difficulties, I produced the voting machine which is shown in Patent 3,112,872 in which, among other things, sliding cam bar 58 is replaced by an arcuately reciprocally gear segment or quadrant 74. While this arrangement made it possible to reduce the over-all size of the voting machine, the fact remains that the gear segment referred to had a reciprocal movement with its attendent disadvantages.

It is therefore a further object of the invention to produce a voting machine the operation of which is controlled by the rotation of a single shaft through one complete rotation.

But, due to the increasingly complex conditions, it is desirable in some cases, and necessary in others, to know not only how many votes a candidate received, or how many voters approved a given proposition, but, also, to know other things about the voters and their motivations. For example, how many women disapproved and so on for age groups and other classifications.

It is therefore a still further object of the invention to produce a voting machine which is versatile in that, in addition to recording the votes cast, it also records other programmed data.

A still further object is to provide a voting machine wherein the data referred to is recorded in a manner which permits tabulation and analysis of said data by presently available computers.

A still further object is to produce a simple machine which is "locked" and unlocked by the reciprocal movement of a single lever controlled by an election, or other supervising officer and which is operated through the voting cycle and through the resetting cycle, by the reciprocal movement of a single lever controlled by the voter.

The full nature of the invention will be understood from the following specification and the accompanying drawings in which.

Figure 1:
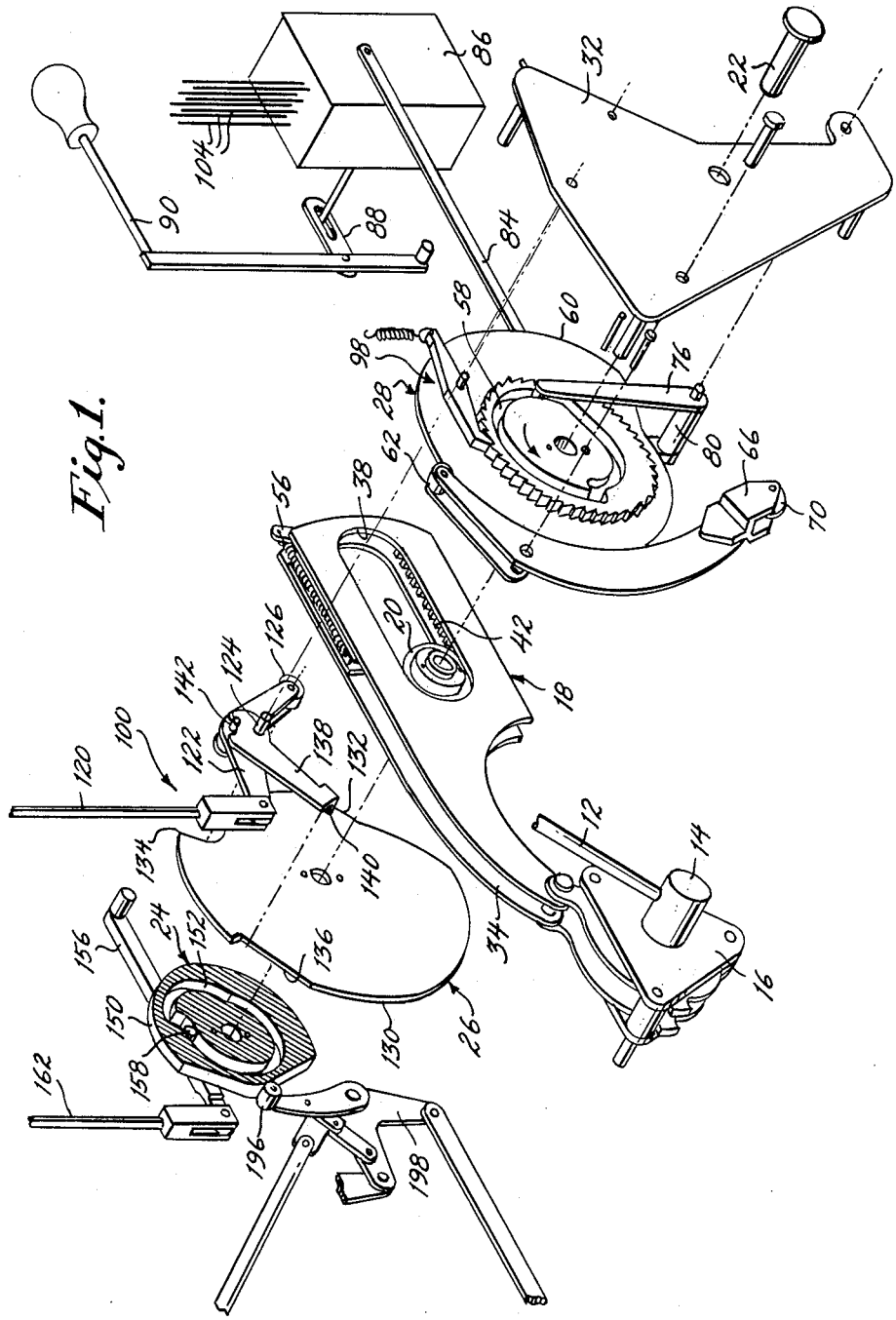
FIG. 1 is an exploded, perspective view of a voting machine control mechanism embodying any invention.

The control mechanism, which is shown in exploded form in FIG. 1, includes a voter-controlled operating handle 12 which is carried by shaft 14 and is movable to the position shown in FIG. 1 to close the curtain and to set the machine up for use by the voters and is movable 90° in the opposite direction to open the curtain and to lock the machine against use. Shaft 14 is journalled in suitable bearings carried by mounting brackets 16. To prevent damage due to excessive pressure on handle 12, or due to pressure exerted on the handle when the machine is locked, the handle is integrated with the shaft by means of a conventional spring loaded detent, not shown.

The control mechanism also includes a converter 18 which translates reciprocal, to unidirectional, rotary motion and vice versa.

Converter 18 may be of the type disclosed in Patent No. 1,060,429, but to make reference to this, or other patents, unnecessary, it is pointed out that the converter, as best shown in FIGS. 7 to 10, includes a driven member 20 mounted on a shaft 22. The driven member 20 controls the counter clockwise rotation of the spindle lock and counter shifter cam 24, the spindle return system cam 26, and the officer's latch and curtain lever cam 28. The shaft 22 is mounted at its ends in mounting walls 30 and 32.

Figure 2:
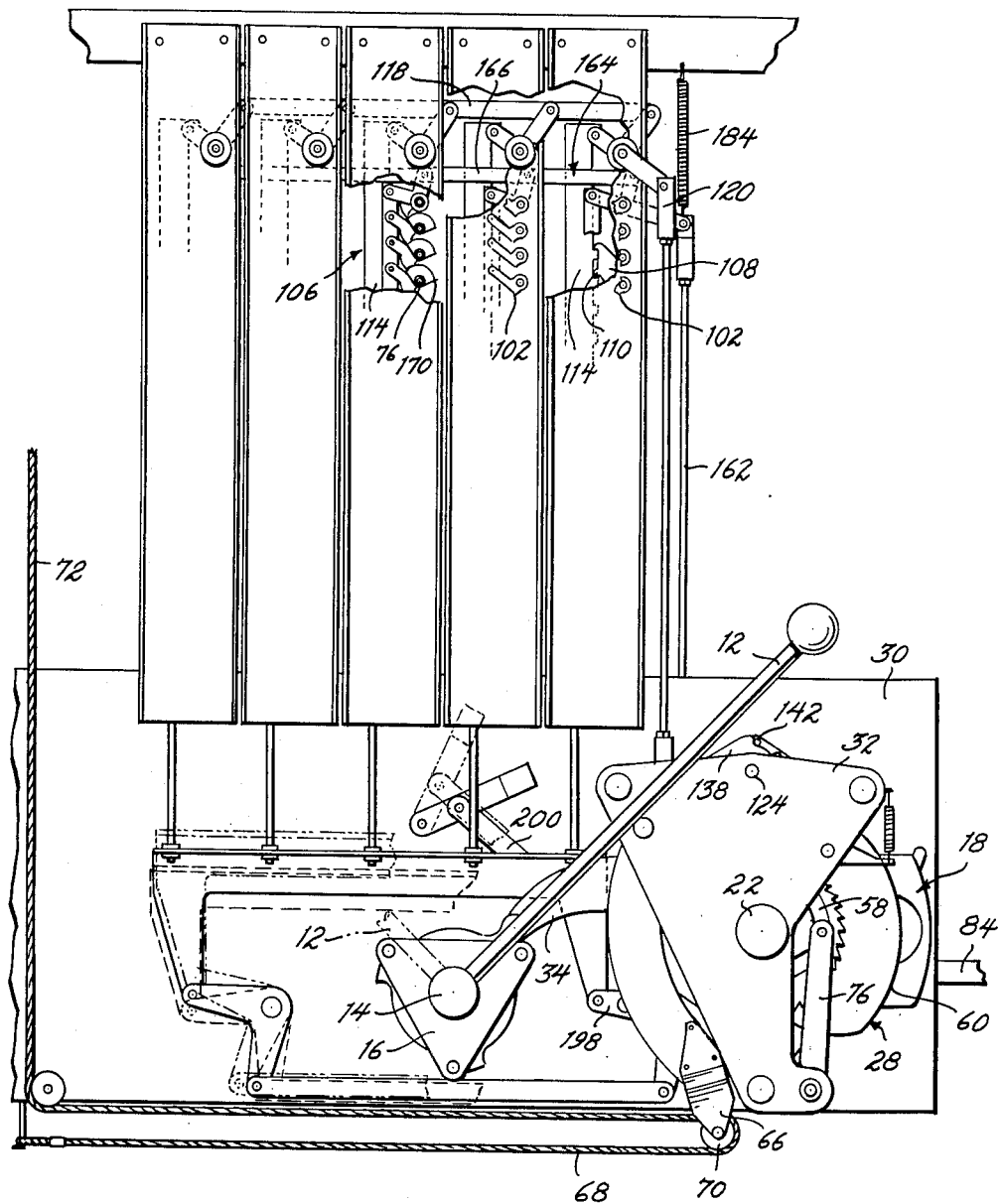
FIG. 2 is a fragmentary, front elevation and view of a voting machine embodying this invention.
Figure 3:
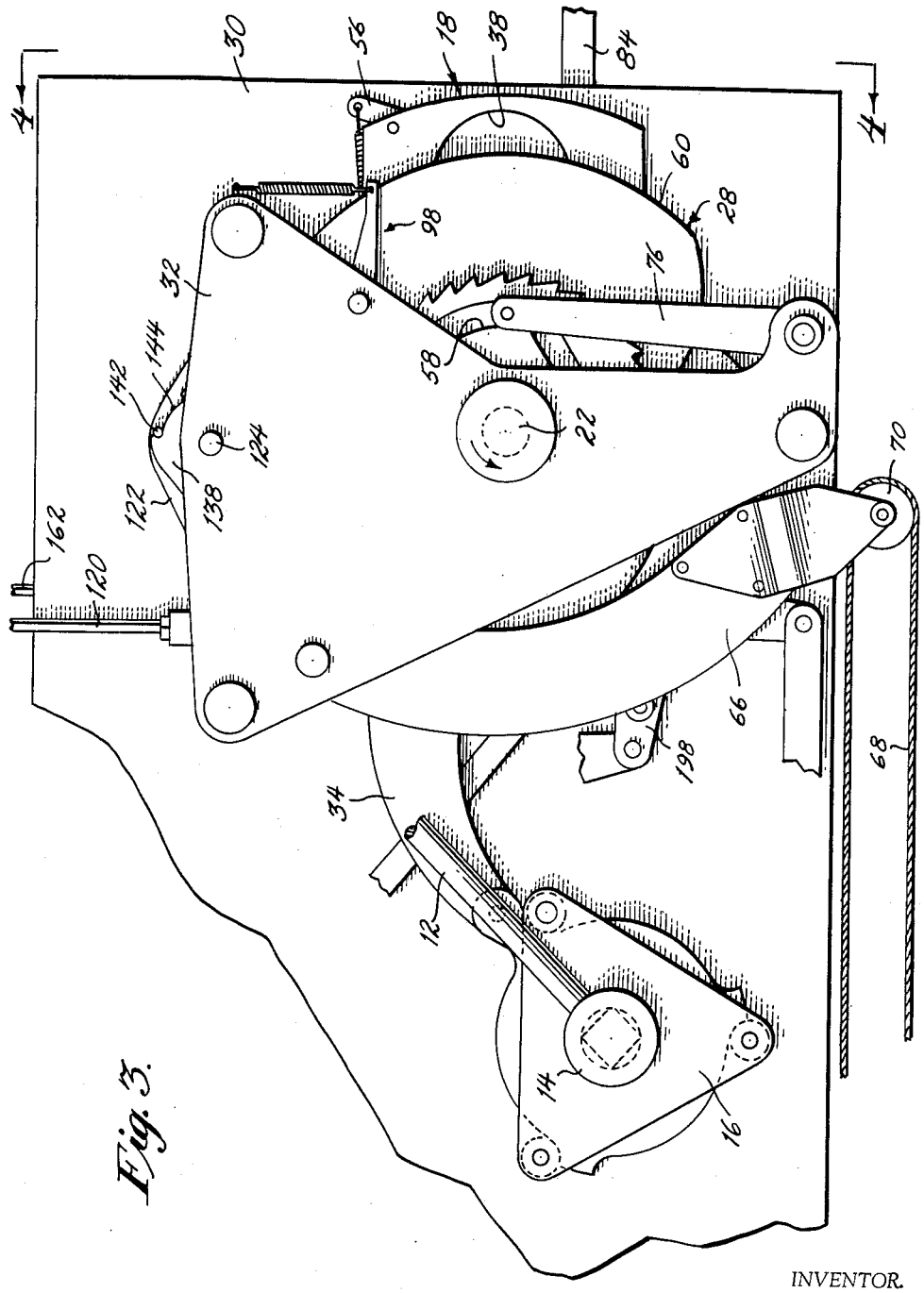
FIG. 3 is an elevational view of some of the parts shown in the right hand portion of FIG. 1 as said parts appear when assembled.
Figure 4:
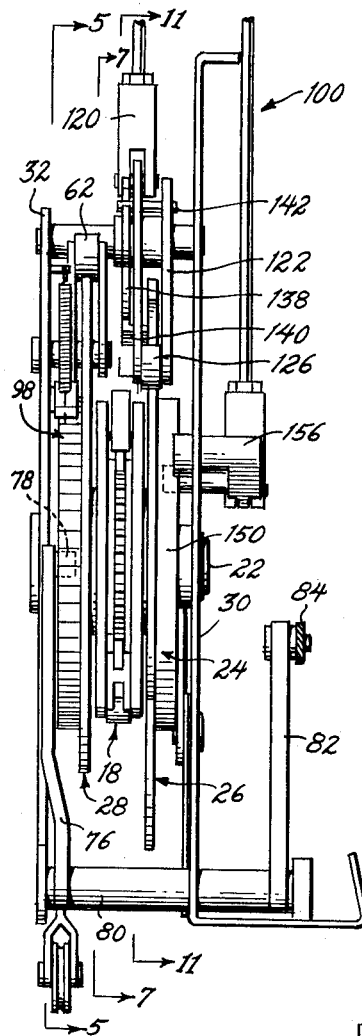
FIG. 4 is an elevational view looking in the direction of arm 4—4 on FIG. 3.

Thus, the curtain handle 12 is intended to be rotated 90 degrees from the position shown in phantom in FIGURE 2 to the position shown in FIGURES 1 and 2 in full line. During this 90 degree rotation, the converter arm 34 of the converter 18 is reciprocated. The purpose of the converter 18 is to convert the reciprocatory movement of the arm 34 into counter clockwise rotation of the shaft 22. This is achieved by providing the driven member 20 with a gear 36 of a fixed radius concentric with the shaft 22. The converter arm 34 has a slot 38 therein which is horizontally disposed and has a pair of opposed horizontal gear tracks 40 and 42 spaced from one another a distance slightly greater than the diameter of the gear 36. The gear tracks 40 and 42 do not extend the entire length of the slot 38.

The converter 18 also includes a cam 44 having a smaller diameter semi-circular portion 46 and a larger diameter semi-circular portion 48 concentric with the shaft 22 and sandwiching the gear 36. The gear racks 40 and 42 have a length equal to the circumference of the smaller diameter semi-circular portion 46. Further, the slot 38 has a pair of spaced horizontal guides 50 and 52 spaced a distance equal to the mean diameters of semi-circular portions 46 and 48.

Adjacent one end of the lower guide track 52 there is provided a pivoted spring biased switch 54 biased to a horizontal position in line with guide track 52. On the opposite end of upper guide track 50 there is also provided a spring biased pivoted switch 56, which is a mirror image of switch arm 54 and is only partly shown in FIGS. 7 and 9.

Converter 18 operates as follows:

Movement of the converter arm 34 from a position in which the driven member 20 was at the far right end of the slot 38 to the position shown in FIGURES 7-10 caused the lower horizontal track 42 to engage the gear 36 and rotate the gear 36 in a counter clockwise direction thus rotating the shaft 22 in a counter clockwise direction. Since the small diameter semi-circular portion 46 is engaged with the lower guide track 52, the gears 36 will be in meshing relation with the gear track 42. Since the larger diameter semi-circular portion 48 will be engaging the upper guide track 50 and gear 36 will be maintained out of engagement with the upper gear track 40. When the driven member 20 approaches the end of gear tracks 40 and 42 as the converter arm 34 moves further to the right, the larger diameter semi-circular portion 48 engages the spring biased pivotal switch 54 forcing the switch 54 downward. It should be noted that the larger diameter semi-circular portion 48 is not touching the lower guide track 52 but, of course, extends below the lower guide track 52 due to the fixed spacing between the upper and lower guide tracks 50 and 52. When the large diameter semi-circular portion 48 has rotated to a position wherein it passes over the last end of upper guide track 50, the spring biased pivotal switch 54 forces the driven member 22 upward, or, as is actually the case, the upper gear track 40 moves downwardly due to the fixed relationship of the shaft 22. Since the gear 36 is now in engagement with the upper gear track 40, it is out of engagement with the lower gear track 42. Further, the switch 54 insures proper alignment of the large diameter semi-circular portion 48 with the guide track 52. The upper guide track 50 is now engaged with the smaller diameter semi-circular portion 46. Accordingly, when the converter arm 34 is now returned to the left, the gear 36 being in engagement with the upper gear track 40 will continue the counter clockwise movement of the driven member 20. Thus, as has been shown, the converter 18 translates the reciprocatory movement of the converter arm 34 into continuous counter clockwise movement of the shaft 22.

As was stated previously, the shaft 22 is operative to rotate the officer's latch and curtain lever cam 28. The officer's latch and curtain lever cam 28 has an inner officer's latch cam track 58 and a peripheral curtain lever cam surface 60.

Figure 5:
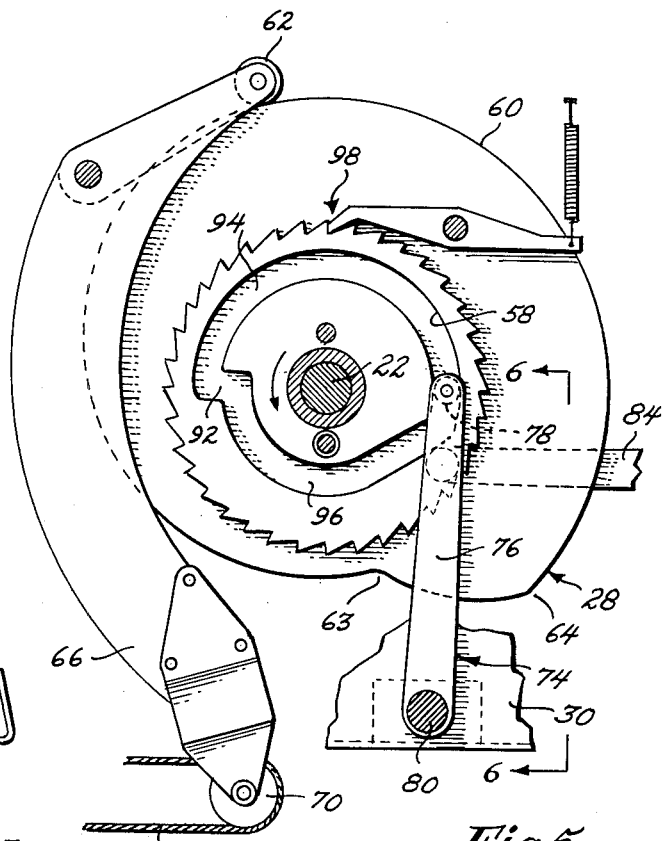
FIG. 5 is similar to FIG. 3 with some of the front parts removed to show internal construction.
Figure 6:
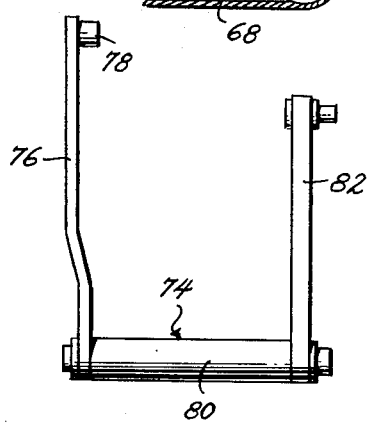
FIG. 6 is a fragmentary elevational view looking in the direction of line 6—6 on FIG. 5 and showing part of the election officer controlled locking and unlocking mechanism.
Figure 7:
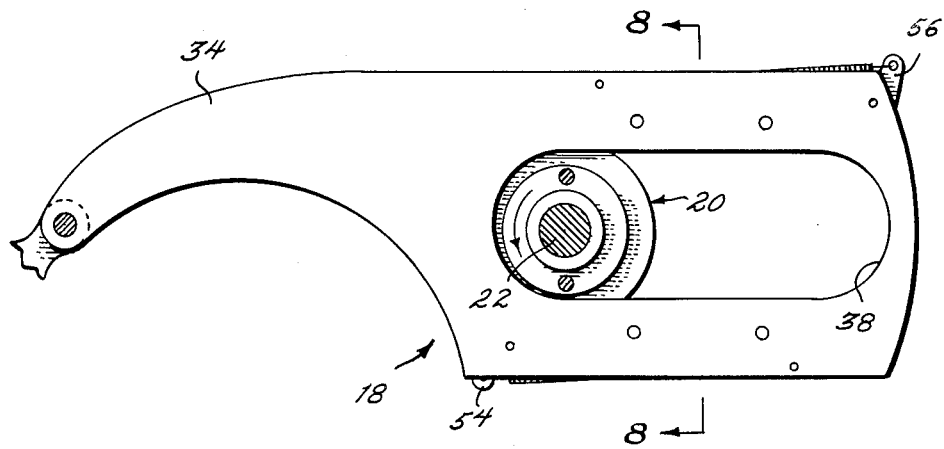
FIG. 7 is a sectional view looking in the direction of lines 7—7 on FIG. 4 and showing the voter controlled operating lever which is also shown in the middle of FIG. 1.
Figures 8, 9:
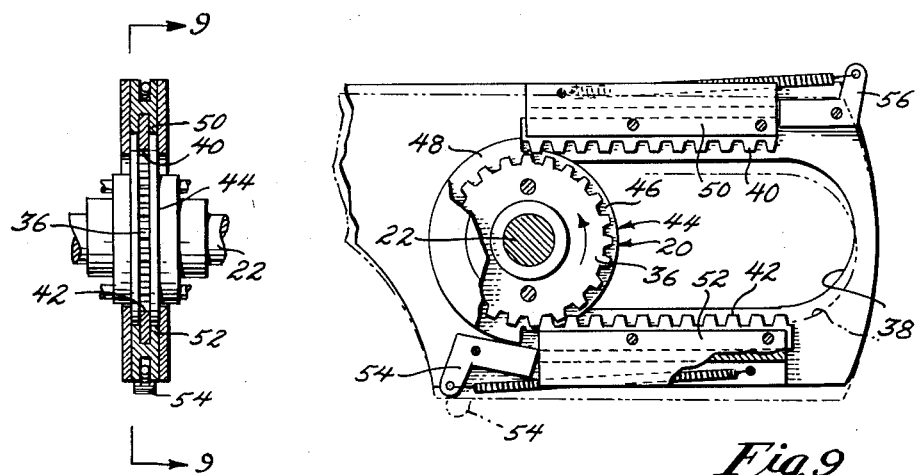
FIG. 8 is a sectional view looking in the direction of lines 8—8 of FIG. 7.
FIG. 9 is a sectional view looking in the direction of lines 9—9 in FIG. 8.
Figure 10:
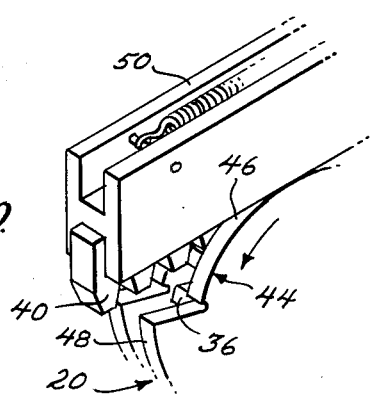
FIG. 10 is a fragmentary perspective view of the gear shown on FIGS. 7–9.

In FIGURE 5, the officer's latch and curtain lever cam 28 is shown after the curtain handle 12 has been rotated 90 degrees. During the 90 degree rotation of the curtain handle 12, the shaft 22 was rotated 180 degrees. Thus, prior to the closing of the curtain by the movement of the curtain handle 12 the curtain lever cam follower 62 was at the innermost radial position 63 on the curtain lever cam surface 60. During 180 degree counter clockwise rotation of the officer's latch and curtain lever cam 28 the curtain lever cam follower 62 was moved outwardly from the innermost radial position 63 to a point 64 of greatest radial distance of the curtain lever cam surface 60. This outward movement of the curtain lever cam follower 62 causes the curtain lever 66 to pull the curtain (not shown) of the voting machine closed. The curtain lever 66 closes the curtain because of its operative connection to the string 68 wound about pulley 70. The string 68 is connected at the end remote from the curtain lever 66 to a spring 72. Thus, rotation of the curtain lever 66 due to the movement of the cam follower 62 on cam surface 60 causes the curtain to be pulled against the bias of the spring 72.

It should be noted that with regard to the cam surface 60, the curtain lever 66 will remain in the position shown as the shaft 22 is rotated still further in a counter clockwise direction as for the next 150 degrees the cam surface 60 remains at the outermost radial position 64 thus maintaining the cam follower 62 in the same position. When the shaft 22 reaches 150 degrees of further rotation, the cam surface 60 sharply changes from the outermost position 64 to the innermost radial position 63. During this change, the spring 72 is operative to move the curtain lever to the curtain open position while forcing the cam follower 62 to follow the cam surface 60 from the outermost radial position to the innermost radial position.

The officer's latch and curtain lever cam includes the officer's latch cam track 58 shown in FIGURE 5 after the curtain handle has been closed. A crank 74 is provided which is U-shaped and has one leg 76 formed with a cam follower 78 at the end thereof. The cam follower 78 rests in the cam track 58. The crank 74 has a bight portion 80 fixedly secured for pivotal movement of the leg 76 thereabout. A second leg 82 is also mounted on the bight 80 and is integral with an officer's latch rod 84. The officer's latch rod 84 is fixedly connected to a punch card block 86 the operation of which will be discussed below. The punch card block 86 is connected through a one way mechanical connecter in the form of a slotted arm 88 to the officer's latch handle 90.

As can be seen in FIGURE 5, when the curtain is open, the cam follower 78 is in a detent portion 92 of the cam guide track 58. In this position, the officer's latch and curtain lever cam 28 is prevented from counter clockwise rotation due to the abutment between the cam follower 78 and the detent 92. By pulling on the officer's latch handle 90, the election officer will pull the cam follower 78 out of the detent 92 onto a constant radius portion 94 of the track 58. During the rotation of the cam 28 while the cam follower 78 is in the constant radius portion 94, the punch card block 86 is maintained in its outermost position thus preventing the punching of the cards placed in front thereof. When the curtain handle 12 is returned to the curtain open position after the voter has completed his voting, the cam track 58 remains as a constant radius while the spindles of the voting machine are locked. This is accomplished in the manner to be discussed below. The cam track 58 has a smaller radius portion 96 on which the cam follower 78 will ride to pull the block 86 to the left as viewed in FIGURE 1 thus uncovering the pins corresponding to the spindles selected by the voter so as to punch the proper holes in the punch card. A more complete description of this operation can be found in copending patent application Serial Number 255,520, entitled Voting Machine, filed February 1, 1963.

It should be noted that the officer's latch and curtain lever cam 28 has a pawl and ratchet arrangement 98 thereon to prevent clockwise rotation of the cam. Thus, it is impossible once the officer's latch 90 has been actuated and the curtain handle 12 rotated for the apparatus to be returned to its initial position.

Further, the apparatus of the present invention additionally includes a spindle return system 100 to insure that at least one vote is made by the voter when he enters the voting booth before he can leave the booth. Thus, in this manner, the voter will be assured that he has turned down the spindles in the correct manner to insure recordation of his vote.

As can be seen in FIGURE 2, the voting machine is provided with series of vertical rows of spindles 102 which are to be turned down by a voter to indicate his vote. The spindles 102 have a variety of functions. First, they are operative to add a count to the counters (not shown) associated therewith. The counters and their operation with respect to the spindles are well known in the art. Secondly, the spindles have connected thereto an individual punch wire 104 which punch wires are fed to the punch block 86 for punching the cards in the manner discussed in my copending patent application discussed previously. The spindles 102 are further connected to a spindle lock lever system 106 which is to be discussed below. Lastly, the spindles 102 are directly connected to individual butterflies 108. The butterfly for each spindle is also integrally associated with a draw bar which forms part of the interlock system of the automatic voting machine in the manner discussed in Patent 2,054,102 discussed previously. It will be understood that any other form of interlock system could be utilized in accordance with the principles of the present invention. The butterflies 108 have a hook-extension 110 which engages a prong 112 on the vertical portion 114 of the return ladder system 116. The return ladder system 116 includes a vertical portion 114 for each vertical row of spindles and corresponding horizontal connecters 118. As shown in FIGURE 2, the return ladder system 116 is in position prior to the turning of a spindle by the voter. The return ladder system 116 is connected to a spindle return rod 120, which rod 120 moves upwardly when the spindle return ladder system 116 moves downwardly and vice versa. The spindle return rod 120 is pivotally connected to an arcuate cam follower 122 pivotally mounted on shaft 124 supported by the walls 30 and 32. The cam follower 122 has a rotary bearing 126 which rests on the peripheral surface 128 of the cam 26. It should be noted that the peripheral surface 128 consists of a large diameter portion 130 and a small diameter portion 132.

Figures 11, 12:
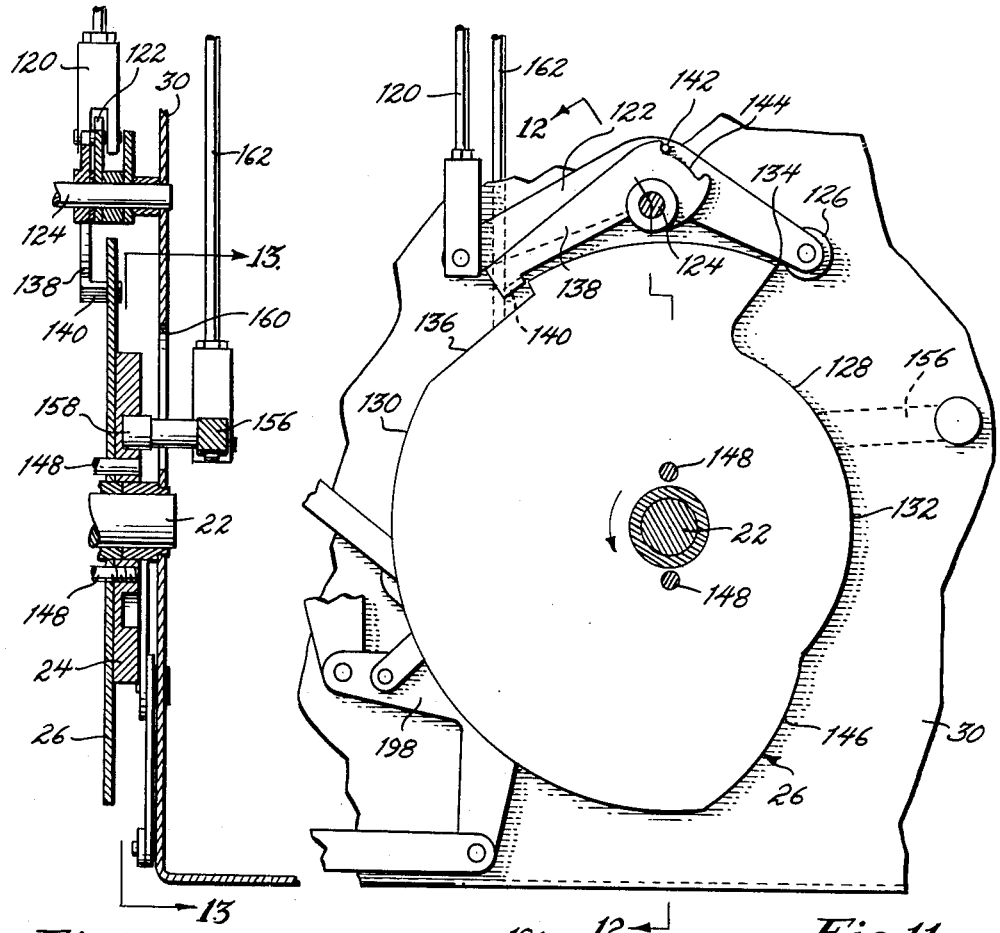
FIG. 11 is a sectional view looking in the direction of lines 11—11 in FIG. 4 and showing details of construction.
FIG. 12 is a sectional view looking in the direction of lines 12—12 of FIG. 11.

In the curtain closed position, prior to the casting of a single vote, the arcuate cam follower 122 has its rotary bearing 126 at the top of division line 134 between the large diameter portion 130 and the small diameter portion 132. Additionally, the large diameter portion 130 is broken by a small flat detent surface 136. The detent surface 136 does not prevent the rotary bearing 126 from continuing around the large diameter portion 130. However, the shaft 124 also has mounted thereon, a spindle lock 138. The spindle lock 138 has an integral tab 140 which, in the position shown in FIGURE 11 rests in the detent 136. Thus, the cam 26 cannot continue its counter clockwise rotation without the tab 140 being lifted from the detent 136. This is necessary to insure the voter will have at least turned down one voting spindle and left it in vote casting position. If he does not, he cannot retract the curtain, for the shaft 22 will not rotate due to the locking action of the spindle lock 138. For this reason, pulling on the handle 12 by the voter while the cam 26 is so locked, will cause the ball and detent arrangement discussed previously in mounting means 16 to override, and thus movement of the handle 12 to its initial position will not cause corresponding movement of the converter arm 34. However, it should be noted that the arcuate cam follower 122 has a pin 142 thereon fitting on top of an arcuate detent 144 formed on the upper surface of the spindle lock 138 above the shaft 124. Accordingly, upward movement of the spindle return rod 120 will cause pin 142 to raise the spindle lock 138. It should be noted, however, that because of the arcuate nature of the detent 144 the spindle lock 138 is not raised until the spindle return rod has reached its uppermost position. When this occurs, the rotary bearing 126 rides down the division line 134 until it reaches the small diameter portion 132 of the peripheral surface 128. As stated previously, the spindle return rod 120 will be lifted only when a single spindle 102 is turned causing the butterfly 108 to have its hook-extension 110 engage the prong 112 on the vertical portion 114 of the return ladder system 116 forcing the entire return ladder system downwardly and lifting the return rod 120 to its uppermost position. Thereafter, any spindle 102 that is turned will not be required to move the ladder system 116 as it will be in its lowermost position. The spindle return system cam 26 is operative during the next 180 degrees of rotation of the shaft 22 due to the 90 degree movement of curtain handle 12 to maintain the rod 120 in its uppermost position as the rotary bearing 126 will follow the small diameter position 132. However, after approximately 100 degrees of rotation on the small diameter portion 132 the rotary bearing 126 will reach the changing diameter portion 146 of the peripheral surface 128. This changing diameter portion 146 slowly increases the diameter of the surface from the small diameter portion 132 to the large diameter portion 130. During this transition, the spindle return rod 120 is forced downwardly by the rotation of the arcuate cam follower 122 about the shaft 124. Downward movement of rod 120 forces the return ladder system 116 upwardly. Movement of the vertical portions 114 of the return ladder system 116 upwardly causes engagement of the prongs 112 with the hook-extension 110 of any butterflies 108 which have been turned downwardly due to the voting by the voter. At this point in time, the voter's selection has been recorded on the counters and the punch cards, and it is desired to return his spindles to the initial position prior to opening of the curtain. Accordingly, the downward movement of rod 120 returns the spindles 102 to their initial position in the manner discussed above. This occurs prior to the last 30 degrees of rotation of the cam shaft 26 during which time the curtain is to be opened. Accordingly, the spindles are returned prior to opening of the curtain and people outside of the voting booth cannot determine how the voter has voted.

The spindle lock and counter shifter cam 24 is fixedly secured to the spindle return system cam 26 by suitable bolts 148. The bolts 148 also rigidly secure the officer's latch and curtain lever cam 28 and the driven member 20 in place.

The spindle lock and counter shifter cam 24 has a peripheral counter shifter cam surface 150 and a spindle lock cam guide track 152. The cam guide track 152 has a constant diameter small radius portion 154 extending for approximately 120 degrees of rotation of the cam 24. The wall 32 has pivotally mounted thereon a spindle lock follower 156 which, at the center thereof, has an extension pin 158 which extends through a vertical slot 160 in wall 32 to rest within the cam guide track 152. The spindle lock follower is pivotally connected at its free end to a spindle lock rod 162 which is integral with a spindle lock ladder system 164. The spindle lock ladder system includes a horizontal rod 166 which is pivotally connected to vertical rod 168. The spindle lock ladder is operative with a plurality of sandwich lock members 170 consisting of opposed arcuate plates 172 connected at the center thereof by a lock pin 174. The sandwich lock member 170 is pivotally mounted on shaft 176 for rotation with the spindle 102. Each of the spindles 102 has an associated sandwich lock member 170. When the spindle lock rod 162 is raised in a manner to be discussed below, the spindle lock ladder system 163 moves downwardly. Each of the vertical rods 168 forming the spindle lock ladder system 164 has a hook 178 spaced immediately above the sandwich lock 170. The hook 178 is intended to fit between the lock pin 174 and one of two joining pins 180 and 182 on either side of the lock pin 174 which pins 180 and 182 are utilized to hold the arcuate plates 172 in place. The spindle lock ladder system 164 is thus operative after a voter has made his selection to lock the spindles in place so that recordation can be simply and easily accomplished. The ladder system 164 is operative by the lowering thereof due to upward movement of the spindle lock rod 162 to force the hook 178 into place on either side of the lock pin 174 and between the lock pin 174 and the joining pin 180 or 182. If the hook 178 fits between the lock pin 174 and the lower joining pin 182, the spindle was not rotated for voting. If the spindle has been turned down to vote for a particular candidate, the hook 178 as it moves downwardly will fit between the lock pin 174 and the upper joining pin 180 to hold the spindle in place during the count operation.

The spindle lock rod 162 is biased to an up position by the spring 184. Spring 184 is not effective to raise the spindle lock rod 162 when the cam 24 is in the position shown in FIGURE 13. That is, in this position, the cam guide track prevents upward movement of the spindle lock follower 156. However, during the next few degrees of rotation of the cam 24, that is when the curtain handle 12 starts to return to the curtain open position, the extension pin 158 enters the notch 186 in the cam track 152 so that the cam track 152 changes from the small diameter portion 154 to a large diameter portion 188 which extends for approximately 30 degrees in length. The large diameter portion 188 is utilized to force the spindle lock follower to move upwardly thus locking the spindles in place during the count operations. The spring 184 pulls the extention pin 158 up the notch 186. If the spring 184 was not there, the extension pin 158 would abut the cam 24 and would thus lock the voting machine in place. Once the cam 24 has rotated for the length of the large diameter portion 188, the guide track 152 changes to a changing diameter portion 190 in which the cam guide track returns to the small diameter portion 154. As stated previously, the spindle lock follower 156 in the small diameter portion 154 aids in maintaining the spindle lock ladder system in the unlocked position. In this position, the hooks 178 are out of engagement with the sandwich locking members 170.

Figure 13:
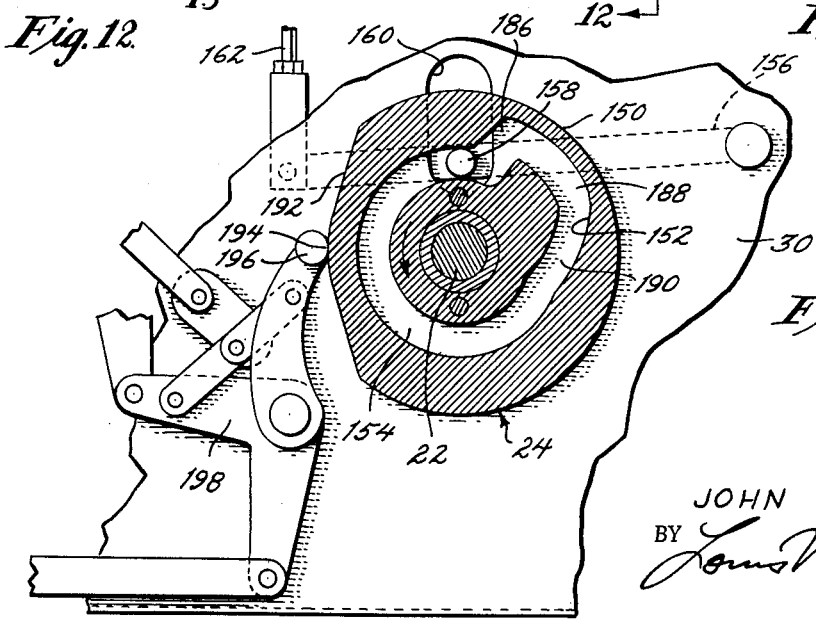
FIG. 13 is a sectional view looking in the direction of lines 13—13 of FIG. 12.
Figure 14:
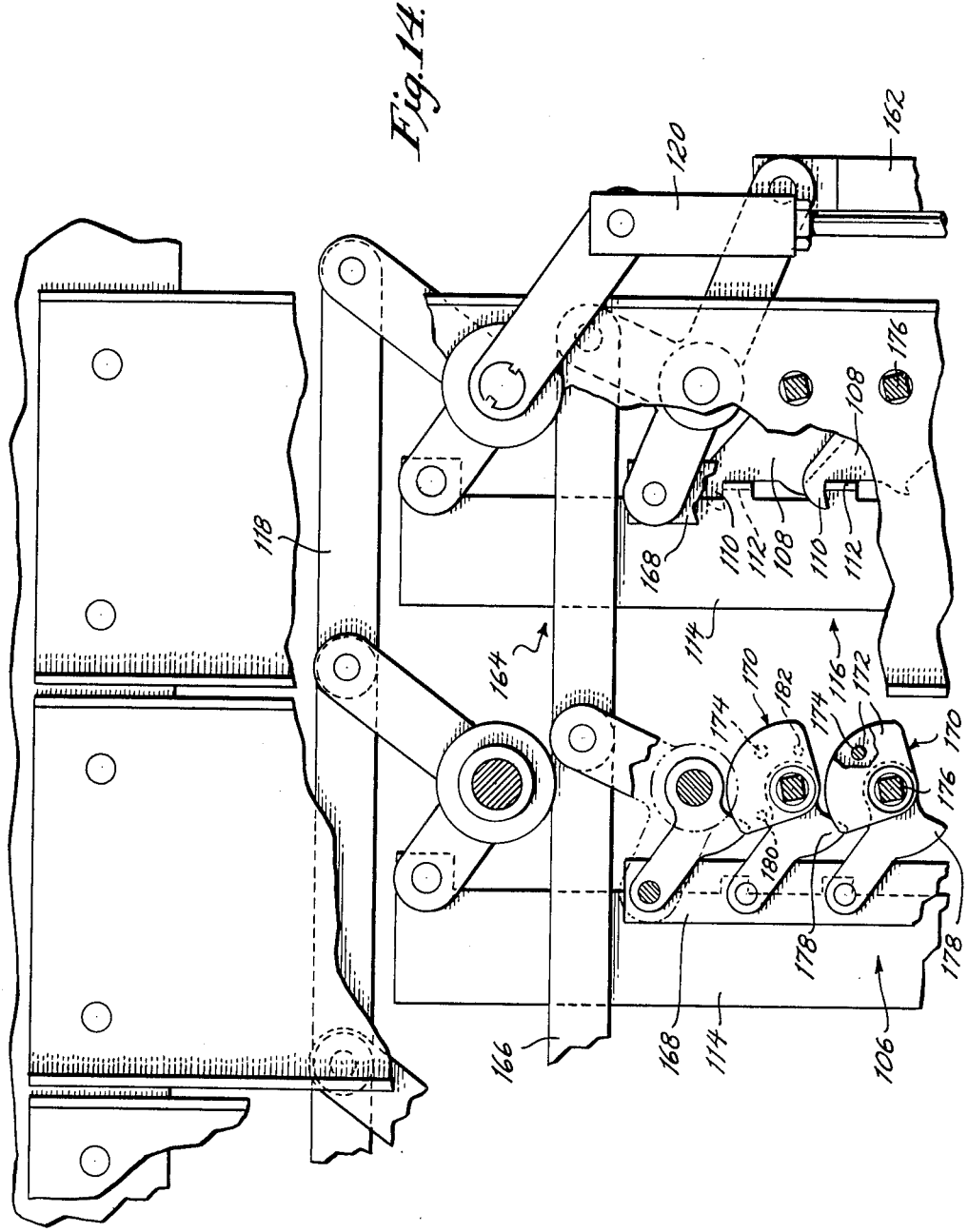
FIG. 14 is an enlargement of a portion of FIG. 2 better to show details of construction.

The spindle lock and counter shifter cam 24 has, as previously noted, a peripheral counter shifter cam surface 150. This counter shifter cam surface 150 is, for approximately 270 degrees thereof, of a constant large diameter. The surface 150 has, however, a gradually receding portion 192 which has a lowermost point 194. The lowermost point 194 is located at the point wherein a counter shifter follower 196 will rest when the curtain handle is in the curtain close position as shown in FIGURE 13. Thus, in this position, the counter shifter follower 196 rests on the smallest radius portion of the surface 150. In this position, the counter shifter follower assembly 198 is operative to engage the spindles 102 with their associated counters. While so engaged, the spindle will add a count to the counter associated therewith by rotating in a standard manner. If the spindle is returned to its non-voting position prior to opening the curtain, the counter will move back one count so that there will be no count added to the counter. However, as soon as the counter shifter follower assembly is moved to disengage the counters from their associated spindles by reason of the rotation of cam 24 so that follower 196 rests on the large diameter portion of the surface 150, rotation of the spindles 102 will not affect the count on the counters associated therewith. As soon as the counter is disengaged, by movement of the shifter follower assembly 198 the count is permanently added to the accumulated total for the individual spindle. In this manner, during each complete rotation of cam 24, while the curtain is in the curtain closed position one may vote by pulling down the spindles, but as soon as the cam 24 is rotated out of the curtain closed position toward the curtain open position the cam follower 196 in moving from the lowermost point 194 to the point of largest diameter will disengage the counters from the spindles until the curtain handle is again returned to the curtain closed position. Thus, each vote can be recorded only when the counters are engaged with the spindles when the curtain is closed.

The shifter follower assembly, of course, as is standard in the art, is provided with a reset cord rod 200 normally fixed in place, which, at the beginning or end of a day can be moved to allow the counters to be reset. The reset rod merely limits the travel of the shifter follower assembly to prevent tampering with the count on the machine.

The operation of the voting machine, in timed sequence, is as follows:

With the curtain opened, the officer in charge will pull the officer's latch handle 90 thus moving the cam follower 78 out of the detent 92 onto the constant radius portion 94 of the officer's latch cam track 58. Now, the handle 12 can be rotated from the phantom position shown in FIGURE 2 to the solid line position, over an arc of 90 degrees. As was stated previously, this 90 degrees of rotation of the handle 12, will, through the converter 18, cause 180 degree rotation of the shaft 22. This rotation is in the counter clockwise direction. The first 180 degrees of rotation of the shaft 22 causes the curtain lever 66 to pull the curtain closed as the cam surface 60 varies from the lowermost portion 63 to the outermost radial portion 64. When the shaft 22 has reached approximately 150 degrees of rotation, the counter shifter cam follower 196 starts to approach the gradually receding portion 192 so as to start the counters into engagement with the spindles through the counter shifter follower assembly 198. At this point, the reset rod 200 is in the operating position shown in full line in FIGURE 2. It should be noted, that when the reset rod 200 is in the position shown in dotted lines in FIGURE 2, the counters can be reset to zero. However, for purpose of this invention, it should be understood that the reset rod 200 is locked in the operating position.

When the handle 12 reaches the end of its 90 degree rotation, the shaft 22 is in the position shown in the drawings. At this position, the voter may turn down those spindles which he desires to operate. The curtain has been closed, the spindles are in the unlocked position, due to the lowering of rod 162 and its position on the cam track 152. The punch card block 86 is in its forwardmost position so that the rotation of the spindles 102 will not force the punch wires 104 through the punch card. The movement of the spindles to the voted position causes, however, the punch wires associated therewith to be extended further forward than those associated with spindles which have not been rotated. The rotation of the first spindle operated by the voter will cause the spindle return ladder system 116 to be moved downwardly in the manner discussed above. This frees the spindle return cam 26 from the locking action of the tab 140.

Next, after completing his vote, the voter moves the handle 12 back towards the curtain open position. The first movement of the curtain handle 12, will cause the spindle lock follower to reach the recess 186 which, by reason of the spring 184 will lift the spindle lock rod 162 upwardly to lock the spindles in place in the manner discussed previously. Then, the shifter follower assembly will start to disengage the counters from the spindles completing this action within the 30 degrees of movement during which the spindles are locked by the spindle lock rod 162. Further, during this 30 degrees when the spindles are locked the cam follower 78 will be operative to move the officer's latch rod 84 to the left as viewed in FIGURE 1 moving the block 86 from its forwardmost position to a point wherein it exposes the punch wires 104 which will be caused to pass through the punch card in the manner discussed in my prior patent application cited previously. Accordingly, it should be noted that the counters have been shifted and the punch cards punched so as to record the vote during the first 30 degrees of rotation of the shaft 22. After this is completed, the spindles are unlocked by continued rotation of the shaft 22 as the spindle lock follower 156 passes down the changing diameter portion 190 of the cam track 172 until it reaches the small diameter portion 154. Further, after the spindles have been unlocked the spindle return cam follower 122 reaches the changing diameter portion 146 of the spindle return system cam 26 so as to cause the spindle return rod 120 to lower, thus returning the spindles to their initial position in the manner discussed previously. After the spindles have reached their initial position, when the spindle return cam follower 122 reaches the large diameter portion 130 the curtain lever cam follower 62 reaches the end of the outermost radial portion 64 and starts on the portion of the surface 60 which changes until it reaches the curtain lever lowermost radial portion 63. During this last 30 degrees of rotation, the curtain is opened due to the action of the spring 72. The spring 72 insures that the cam follower 62 will follow the surface 60 during the change from the outermost position 64 to the innermost position 63. The detent 92 insures no further movement of the shaft 22 until the officer's latch handle 90 is again pulled by the officer in charge of the voting booth.

It has been seen, that the functions of the various cam surfaces are extremely different during the first 180 degrees of rotation of the shaft 22 than for the second 180 degrees of rotation of the shaft 22. Thus, it can be seen that these functions could not easily be accomplished on the sliding horizontal main cams as have been utilized in the past without the necessity for special mechanical latches and the like. Further, additional functions can be achieved without extreme redesigning of the apparatus. Accordingly, the punch card system can be expanded if desired to include special feeding functions without the necessity of a complete redesign of the voting machine.

The present invention may be embodied in other specific forms without departing from the spirit or essential attributes thereof and, accordingly, reference should be made to the appended claims rather than to the foregoing specification as indicating the scope of the invention.

I claim:

1. An automatic voting machine comprising actuation means operative in a first step to set a voting machine for voting and in a second step to return the voting machine to its initial positon after voting, a curtain closing means operative from said actuation means to close a curtain on the voting machine during said first step and to open the curtain at the end of said second step, a plurality of spindles operatively set at the end of said first step to be selectively actuated by a voter, spindle locking means operative from said actuation means to lock said spindles in place at the start of said second step, recording means operative to record the position of said spindles when said spindles are locked by said spindle locking means, said locking means being operative to release said spindles during said second step after said spindle recording means has recorded the position of said spindles, and spindle resetting means operative from said actuation means to return said spindles to their initial set position during said second step after said spindle locking means has unlocked said spindles and before said curtain closing means has opened said curtain, and wherein said spindle locking means includes a ladder system mechanically interlocking at least one locking member for each spindle, said spindles having a voted and an unvoted position, said locking members being operative when said ladder system is reciprocated into a locked position to lock said spindles in their respective voted or unvoted positions.

2. The automatic voting machine of claim 2 wherein said locking member is a hook, each of said spindles having a female locking member rotatable therewith, said female locking members including a horizontal locking pin and a pair of abutments on opposite sides of said locking pin, said hook fittng between said locking pin and one of said abutments when said spindle is in its voted position, said hook fitting between said locking pin and the other of said abutments when said spindle is in its unvoted position.

3. The automatic voting machine of claim 2 wherein said spindle locking means includes a reciprocal rod, said reciprocal rod being operative to raise and lower said ladder system, said spindle locking means further including a cam, said reciprocal rod being controlled by rotation of said cam, and means biasing said reciprocal rod to a position wherein said spindles are locked.

4. An automatic voting machine comprising actuation means operative in a first step to set a voting machine for voting and in a second step to return the voting machine to its initial position after voting, a curtain closng means operative from said actuation means to close a curtain on the voting machine during said first step and to open the curtain at the end of said second step, a plurality of spindles operatively set at the end of said first step to be selectively actuated by a voter, spindle locking means operative from said actuation means to lock said spindles in place at the start of said second step, recording means operative to record the position of said spindles when said spindles are locked by said spindle locking means, said locking means being operative to release said spindles during said second step after said spindle recording means has recorded the position of said spindles, and spindle resetting means operative from said actuation means to return said spindles to their initial set position during said second step after said spindle locking means has unlocked said spindles and before said curtain closing means has opened said curtain, and wherein said actuation means includes a drive shaft, said first step being completed during one half cycle of rotation of said drive shaft, said second step being completed during the next half cycle of rotation of said drive shaft, including unidirectional movement means, said last mentioned means insuring rotation of said drive shaft in only one direction.

5. The combination with a voting machine which has:
   a first, curtain-operating mechanism,
   a second, voting-spindle return mechanism, and
   a third, vote-counter operating mechanism, of means for initiating and completing the operation of said mechanisms in timed relation and in the order named, said means including:
     a shaft,
     an actuating handle reciprocable through about 90°,
     a motion converter intermediate said handle and said shaft for translating the movement of said handle, in one direction, into uni-directional direction of said shaft through about 180° and for translating the reverse movement of said handle into further rotation of said handle, in in the same direction, through the remaining 180°;
     a first cam on said shaft, means operatively connecting said first cam to said first mechanism,
a second cam on said shaft,
means operatively connecting said second cam to second mechanism,
a third cam on said shaft, and
means operatively connecting said third cam to said third mechanism,
said first cam being so shaped as to effect the closing of the curtain on the initial movement of said handle and to effect the opening of said curtain on the return movement of said handle,
said second cam being so shaped that, upon return movement of said handle, said cam moves said spindle return member in a direction to reset said spindles, and
said third cam being shaped as to effect movement of the vote counters into engagement with said spindle upon initial movement of said handle and to disengage the counters from said spindles upon return movement of said handle.

References Cited by the Examiner
UNITED STATES PATENTS

| | | | |
|---|---|---|---|
| 2,054,102 | 9/36 | Shoup et al. | 235—55 |
| 2,195,848 | 4/40 | Carroll | 235—50 |
| 2,826,365 | 3/58 | Shoup | 235—51 X |
| 3,112,872 | 12/63 | Lord | 235—55 |

LEO SMILOW, *Primary Examiner.*